(12) United States Patent
Daughtrey et al.

(10) Patent No.: US 8,341,004 B2
(45) Date of Patent: Dec. 25, 2012

(54) DYNAMICALLY MANAGING ELECTRONIC CALENDAR EVENTS BASED UPON KEY PERFORMANCE INDICATORS (KPIS) WITHIN A BUSINESS PROCESS MONITORING (BPM) SYSTEM

(75) Inventors: Caroline Cross Daughtrey, Durham, NC (US); Scott D. Johnson, Durham, NC (US); Christopher M. Ketchuck, Durham, NC (US); Stephanie L. Walter, Morrisville, NC (US); Eric D. Wayne, Raleigh, NC (US); Yingxin Xing, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1219 days.

(21) Appl. No.: 12/145,202

(22) Filed: Jun. 24, 2008

(65) Prior Publication Data

US 2009/0319320 A1    Dec. 24, 2009

(51) Int. Cl.
*G06Q 10/00*    (2012.01)
(52) U.S. Cl. .................. 705/7.18; 705/7.14; 705/7.15; 705/7.16; 705/7.17
(58) Field of Classification Search ......... 705/7.11–7.42
See application file for complete search history.

(56) References Cited

U.S. PATENT DOCUMENTS

| | | | |
|---|---|---|---|
| 6,898,569 B1 * | 5/2005 | Bansal et al. | 705/7.16 |
| 7,523,048 B1 * | 4/2009 | Dvorak | 705/7.31 |
| 8,005,707 B1 * | 8/2011 | Jackson et al. | 705/7.29 |
| 2002/0099578 A1 * | 7/2002 | Eicher et al. | 705/7 |
| 2002/0099579 A1 * | 7/2002 | Stowell et al. | 705/7 |
| 2006/0116918 A1 * | 6/2006 | Flora et al. | 705/8 |
| 2007/0271129 A1 * | 11/2007 | Dutton et al. | 705/8 |

OTHER PUBLICATIONS

"Deltek Vision", KPI-Insight Consulting, 2007.

* cited by examiner

*Primary Examiner* — David Rines
(74) *Attorney, Agent, or Firm* — Patents on Demand P.A.; Brian K. Buchheit; Scott M. Garrett

(57) ABSTRACT

The present invention can include a solution that dynamically manages electronic calendar events based upon the key performance indicators (KPIs) of a business process monitoring (BPM) system. Such a system can include a BPM system, an electronic calendar software application, and a dynamic calendar event manager. The BPM system can be configured to manage data for many user-defined KPIs. The electronic calendar software application can be configured to manage the calendar data of various calendar events for many users. The dynamic calendar event definition can be configured to define a condition for modifying the calendar data of a user-specified calendar event. The dynamic calendar event definition can consist of a KPI threshold value, a calendar action, and an applicable attendee list. The dynamic calendar event manager can be configured to dynamically and automatically handle the modification of the calendar data in accordance with the dynamic calendar event definition.

20 Claims, 2 Drawing Sheets

DYNAMICALLY MANAGING ELECTRONIC CALENDAR EVENTS BASED UPON KEY PERFORMANCE INDICATORS (KPIS) WITHIN A BUSINESS PROCESS MONITORING (BPM) SYSTEM

BACKGROUND OF THE INVENTION

The present invention relates to the field of electronic calendar management, and, more particularly, to dynamically managing electronic calendar events based upon key performance indicators (KPIs) within a business process monitoring (BPM) system.

Business process monitoring (BPM) systems are an effective means for an organization to evaluate a variety of key performance indicators (KPIs). These KPIs provide information for making critical business decisions. The values of KPIs change dynamically as daily business activities are conducted. Employees need to be able to respond to these changing business needs in a timely manner.

Many organizations use an electronic calendar software application in an attempt to organize responses, in the form of calendar events like meetings, to the business situations identified by the BPM system. Conventional systems lack automation for bridging communications between a BPM system and an electronic calendar software application. Calendar events are therefore required to be managed manually, without any automation that allows the calendar events to be dynamically modified based on the KPI data.

As such, this manual process is fundamentally inefficient because the creation or modification of a calendar event relies upon the recognition of the change in the KPI data by a designated person. For example, a sales manager may be out of the office when the BPM system identifies a sudden drop in daily sales. Thus, a meeting to address this issue can be delayed hours, costing the organization additional revenue.

BRIEF SUMMARY OF THE INVENTION

The present invention can be implemented in accordance with numerous aspects consistent with the materials presented herein. One aspect of the present invention can include a system that dynamically manages electronic calendar events based upon the key performance indicators (KPIs) of a business process monitoring (BPM) system. Such a system can include a BPM system, an electronic calendar software application, and a dynamic calendar event manager. The BPM system can be configured to manage data for many user-defined KPIs. The electronic calendar software application can be configured to manage the calendar data of various calendar events for many users. The dynamic calendar event definition can be configured to define a condition for modifying the calendar data of a user-specified calendar event. The dynamic calendar event definition can consist of a KPI threshold value, a calendar action, and an applicable attendee list. The dynamic calendar event manager can be configured to dynamically and automatically handle the modification of the calendar data associated with the user-specified calendar event in accordance with the dynamic calendar event definition.

Another aspect of the present invention can include a method for dynamically managing electronic calendar events based upon key performance indicators (KPIs) of a business process monitoring (BPM) system. Such a method can begin with the creation of a dynamic calendar event definition for a user-specified calendar event. The dynamic calendar event definition can consist of a KPI threshold value, a calendar action, and an applicable attendee list. KPI data that was collected by a business process monitoring (BPM) system can be monitored. The satisfaction of the KPI threshold value by the KPI data can be dynamically determined in real-time. When the KPI threshold value is satisfied, the calendar data of an electronic calendar software application associated with the user-specified calendar event can be automatically modified.

Still another aspect of the present invention can include a dynamic calendar event manager for dynamically managing electronic calendar events based upon key performance indicators (KPIs) of a business process monitoring (BPM) system. The dynamic calendar event manager can include dynamic calendar event definitions, a calendar event monitor, and a calendar action processor. The dynamic calendar event definitions can define conditions for modifying the calendar data of an electronic calendar software application for a user-specified calendar event. Each dynamic calendar event definition can consist of a KPI threshold value, a calendar action, and an applicable attendee list. The calendar event monitor can be configured to communicate with the BPM system to determine the satisfaction of a KPI threshold value of a dynamic calendar event definition. The calendar action processor can be configured to send calendar action messages to the electronic calendar software application in response to the satisfaction of the KPI threshold value. A calendar action message can contain commands that can be executed by the electronic calendar software application.

BRIEF DESCRIPTION OF THE SEVERAL VIEWS OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
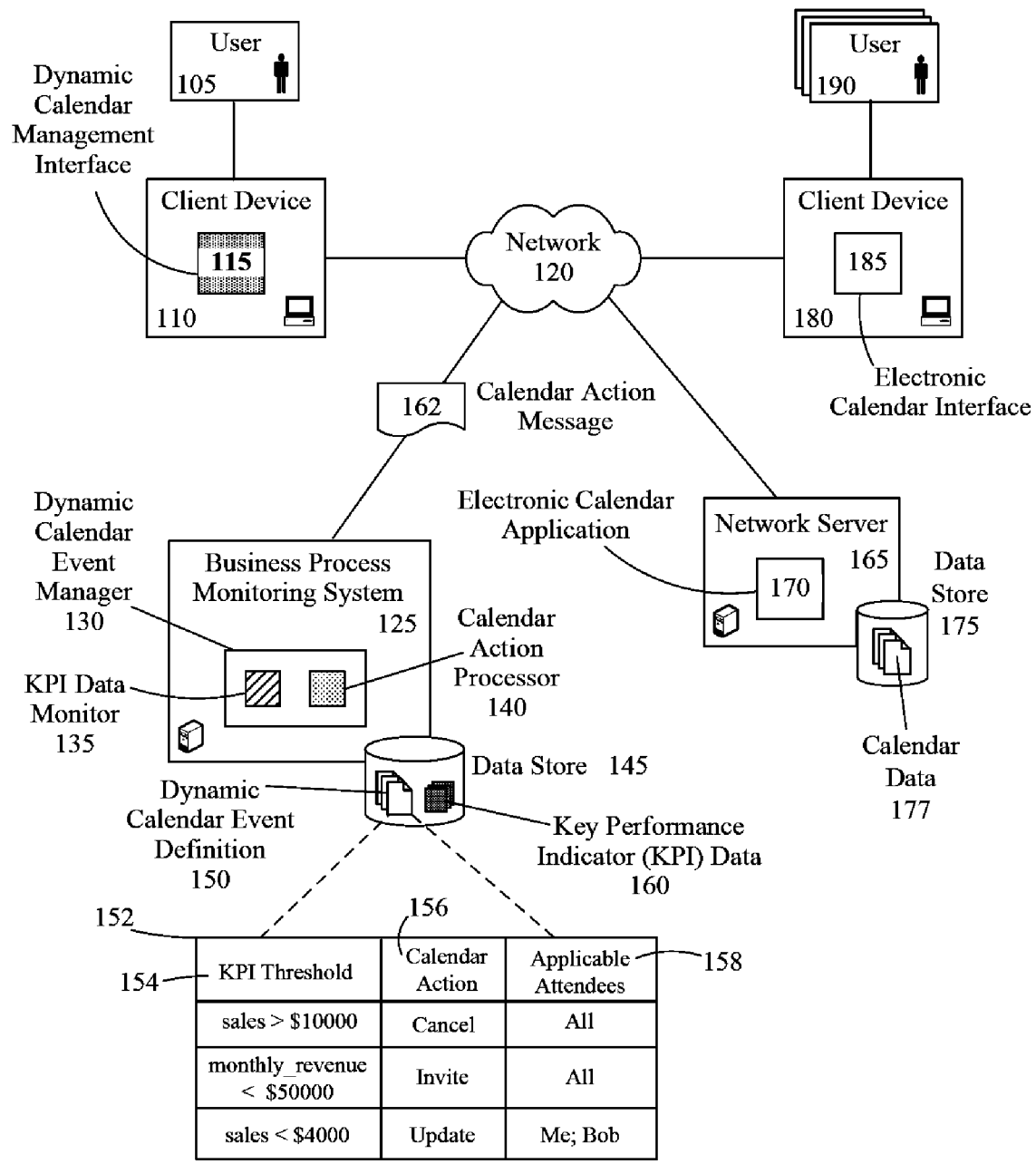
FIG. 1 is a schematic diagram illustrating a system that dynamically manages electronic calendar events 177 based upon key performance indicators (KPIs) of a business process monitoring (BPM) system in accordance with embodiments of the inventive arrangements disclosed herein.

The present invention discloses a solution that dynamically manages electronic calendar events based upon the key performance indicators (KPIs) of a business process monitoring (BPM) system. Threshold values corresponding to the various KPIs of the BPM system can be defined in a dynamic calendar event definition. A calendar action and an applicable attendee list can be included in the dynamic calendar event definition, associated with the KPI threshold. A dynamic calendar event manager can monitor the KPI data of the BPM system to determine the satisfaction of KPI threshold values. When a KPI threshold value has been met, the dynamic calendar event manager can send a calendar action message to the electronic calendar software application. The calendar action message can represent a translation of the calendar action and applicable attendee list of the dynamic calendar event definition, which can cause the electronic calendar software application to modify the corresponding calendar data.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 that dynamically manages electronic calendar events 177 based upon key performance indicators (KPIs) 160 of a business process monitoring (BPM) system 125 in accordance with embodiments of the inventive arrangements disclosed herein. In system 100, a user 105 can create a dynamic calendar event definition 150 that utilizes KPI data 160 to dynamically manage the calendar event data 177 of an electronic calendar application 170 for multiple other users 190.

The BPM system 125 can represent a software system that can interface with other computer systems for the purpose of collecting data 160 for a variety of KPIs. In one embodiment, the BPM system 125 can be any of a variety of commercially available ones and the other computer systems can be pre-existing ones. The BPM system 125 can operate on a central computing device or in a distributed manner, among multiple computing devices.

User 105 can utilize a dynamic calendar management interface 115 running on a client device 110 to create the dynamic calendar event definition 150. The client device 110 can be a variety of computing devices capable of communicating with the other components of system 100 over a network 120.

The dynamic calendar management interface 115 can be a user interface associated with the dynamic calendar event manager 130. The dynamic calendar management interface 115 can be configured to allow the user 105 to perform a variety of operations, such as create and modify, upon a dynamic calendar event definition 150. In an alternate embodiment, the dynamic calendar management interface 115 can be implemented as a plug-in component of the electronic calendar interface 185.

A dynamic calendar event definition 150 can represent one or more conditions of KPI data 160 and corresponding modifications for the calendar data 177 of a user-specified calendar event. Table 152 contains example data for a dynamic calendar event definition 150. Data items contained in a dynamic calendar event definition 150 can include KPI thresholds 154, calendar actions 156, and applicable attendee lists 158.

The KPI threshold 154 can represent a triggering condition for the calendar action 156 upon the applicable attendee list 158. The KPI threshold 154 can correspond to a KPI for which the BPM system 125 collects data 160. Further, the KPI threshold 154 can utilize logical operators to associate multiple KPI data elements. For example, a KPI threshold 154 can be defined as with two conditions joined by the logical operator AND, such as in a range of values (e.g., sales>$4000 AND sales<$15000).

Calendar actions 156 can represent how the calendar data 177 is to be modified. As shown in table 152, calendar actions 154 can include an invite action, a cancel action, and an update action. It is important to note that the calendar action 154 must correspond to actions that the electronic calendar software application 170 can perform. Additionally, a calendar action 154 can require additional data (not shown) to be specified within the dynamic calendar event definition 150. For example, an update action 154 changing a meeting time requires the new meeting time to be defined.

The applicable attendee list 158 can correspond to one or more of the attendees of the calendar event for which the calendar action 154 is being executed upon. For example, any attendee of a weekly status meeting whose sales is over $30000 need not attend. Therefore, attendees of the meeting can dynamically and automatically receive meeting cancellations as their sales figures exceed $30000.

The dynamic calendar event definition 150 can be stored in a data store 145 accessible by the dynamic calendar event manager 135. The dynamic calendar event manager 130 can be a software application configured to monitor the KPI data 160 of the BPM system 125 to determine the satisfaction of KPI threshold values 154. When a KPI threshold 154 is satisfied, the dynamic calendar event manager 125 can execute actions for modifying the calendar data 177 according to the calendar action 156 associated with the KPI threshold 154.

As shown in system 100, the dynamic calendar event manager 130 can be a component of the BPM system 125. In an alternate embodiment, the dynamic calendar event manager 130 can operate from a computing device that is capable of communicating with both the BPM system 125 and the electronic calendar application 170 over a network, such as network 120.

The dynamic calendar event manager 125 can include a KPI data monitor 135 and a calendar action processor 140. The KPI data monitor 135 can represent the portion of the dynamic calendar event manager 125 configured to monitor the KPI data 160 of the BPM system 125 and can determine the satisfaction of KPI thresholds 154 of the dynamic calendar event definitions 150.

The KPI data monitor 135 can monitor the KPI data 160 in a variety of ways, including, but not limited to, intercepting alert communications of the BPM system, querying the data store 145 containing the KPI data 160, utilizing an information service of the BPM system, and the like. It should be noted that the KPI data monitor 135 can be configured to operate using the communication protocols available to the BPM system.

When a KPI threshold 154 is met, the KPI data monitor 135 can invoke the calendar action processor 140. The calendar action processor 140 can represent the portion of the dynamic calendar event manager 130 configured to handle the calendar action 156 associated with the satisfied KPI threshold 154. The calendar action processor 140 can generate a calendar action message 162 representing the calendar action 156 and the applicable attendee list 158 of the satisfied KPI threshold 154.

The calendar action message 162 can include commands that can be executed by the electronic calendar application 170 in order to properly modify the calendar data 177. Additionally, the calendar action message 162 can contain instructions for the electronic calendar application 170 that utilize an application programming interface (API). For example, a calendar action message 162 for an update calendar action 156 can include machine-readable instructions that cause the electronic calendar application 170 to change the meeting time for the users 190 on the applicable attendee list 158.

The dynamic calendar event manager 130 can transmit the calendar action message 162 to the electronic calendar application 170. The electronic calendar application 170 can represent a commercially-available software application configured to manage calendar data 177 stored in an accessible data store 175. The electronic calendar application 170 can be configured to operate upon a network server 165 and can communicate with client devices 110, 180, and the dynamic calendar event manager 130 over the network 120.

Users 190 whose calendar data 177 was modified by the electronic calendar application 170 in response to a calendar action message 162 can view the modified calendar data 177 via an electronic calendar interface 185 on a client device 180. The electronic calendar interface 185 can represent the user interface of the electronic calendar application 170 that displays the calendar data 177.

It is important to emphasize that once a user 105 creates a dynamic calendar event definition 150 that the modifications to the calendar data 177 occurs as various KPI thresholds 154 are met by the KPI data 160. Thus, changes to the calendar data 177 occur dynamically and without further user 105 intervention.

Network 120 can include any hardware/software/and firmware necessary to convey data encoded within carrier waves. Data can be contained within analog or digital signals and conveyed though data or voice channels. Network 120 can include local components and data pathways necessary for communications to be exchanged among computing device components and between integrated device components and peripheral devices. Network 120 can also include network equipment, such as routers, data lines, hubs, and intermediary servers which together form a data network, such as the Internet. Network 1205 can also include circuit-based communication components and mobile communication components, such as telephony switches, modems, cellular communication towers, and the like. Network 120 can include line based and/or wireless communication pathways.

As used herein, presented data stores 145 and 175 can be a physical or virtual storage space configured to store digital information. Data stores 145 and 175 can be physically implemented within any type of hardware including, but not limited to, a magnetic disk, an optical disk, a semiconductor memory, a digitally encoded plastic memory, a holographic memory, or any other recording medium. Data stores 145 and 175 can be a stand-alone storage unit as well as a storage unit formed from a plurality of physical devices. Additionally, information can be stored within data stores 145 and 175 in a variety of manners. For example, information can be stored within a database structure or can be stored within one or more files of a file storage system, where each file may or may not be indexed for information searching purposes. Further, data stores 145 and/or 175 can utilize one or more encryption mechanisms to protect stored information from unauthorized access.

Figure 2:
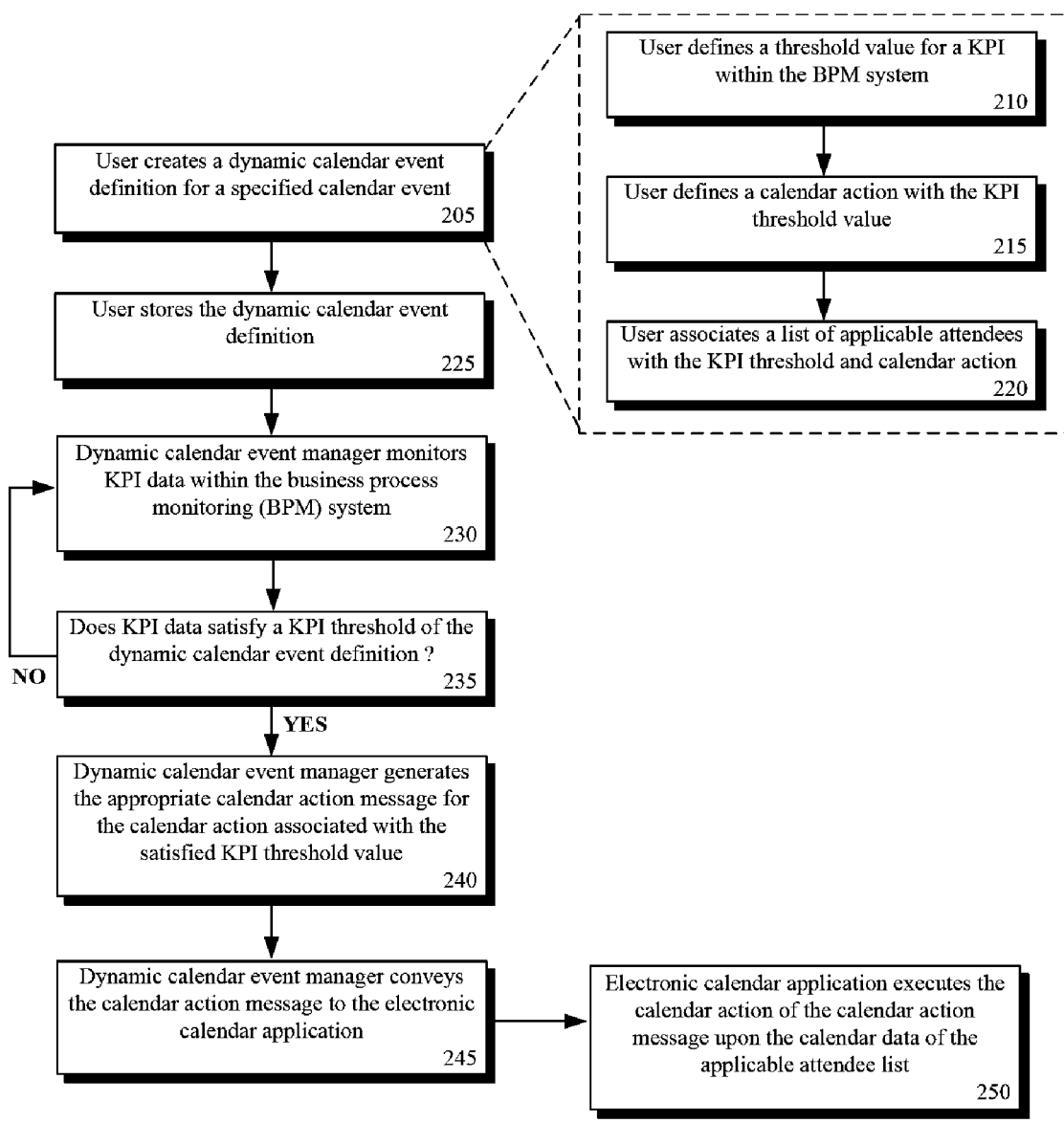
FIG. 2 is a flow chart of a method detailing the use of a custom element definition tool to simplify the creation and sharing of a user-defined custom element within a graphical modeling application in accordance with an embodiment of the inventive arrangements disclosed herein.

FIG. 2 is a flow chart of a method 200 for dynamically managing electronic calendar events based upon key performance indicators (KPIs) of a business process monitoring (BPM) system in accordance with an embodiment of the inventive arrangements disclosed herein. Method 200 can be performed in the context of system 100 or any other system configured to dynamically manage electronic calendar events based upon the KPI data.

Method 200 can begin with step 205 where a user can create a dynamic calendar event definition. Step 205 can be comprised of steps 210, 215, and 220. In step 210, the user can define a threshold value for a KPI within the BPM system. A calendar action can be defined by the user for the KPI threshold value in step 215. In step 220, a list of applicable attendees can be associated with the KPI threshold and calendar action.

The dynamic calendar event definition can be stored in a location accessible by the dynamic calendar event manager in step 225. In step 230, the dynamic calendar event manager can monitor the KPI data of the BPM system. The dynamic calendar event manager can determine if a KPI threshold has been satisfied in step 235.

When a KPI threshold has not been met, flow can return to step 230 where the dynamic calendar event monitor continues to monitor the KPI data. When a KPI threshold has been met, step 240 can execute where the dynamic calendar event manager can generate the appropriate calendar action message for the calendar action associated with the satisfied KPI threshold.

In step 245, the dynamic calendar event manager can convey the calendar action message to the electronic calendar application. The electronic calendar application can execute the calendar action contained in the calendar action message upon the calendar data of the applicable attendee list in step 250.

The diagrams in FIGS. 1-2 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system that dynamically manages calendar events based upon key performance indicators (KPIs) of a business process monitoring (BPM) system comprising:

a business monitoring (BPM) system, comprising at least one processor and memory storing software applications executed by the processor, the business monitoring (BPM) system further configured to monitor data for a plurality of key performance indicators (KPIs), wherein each KPI represents a business variable capable of being quantitatively measured the business monitoring (BPM) system further including;

an electronic calendar software application configured to manage calendar data for a plurality of calendar events and for a plurality of users;

a dynamic calendar software application configured to manage calendar data for a plurality of calendar events and for a plurality of users;

a dynamic calendar event definition of the electronic calendar software application configured to define at least one condition for modifying the calendar data of a user-specified calendar event, wherein the dynamic calendar event definition comprises at least one KPI threshold value, an associated calendar action, and an applicable attendee list, wherein changes made to the business process monitoring system and the electronic calendar software application are independent of each other, wherein changes made in the business process monitoring system result in changes being made by the electronic calendar software application to calendar events; and a dynamic calendar event manager configured to determine whether the at least one KPI threshold value is satisfied and dynamically and automatically modify the calendar data and the applicable attendee list associated with the user-specified calendar event responsive to satisfaction of the at least one KPI threshold value and in accordance with the dynamic calendar event definition.

2. The system of claim 1, wherein the dynamic calendar event manager further comprises:

a calendar event monitor configured to communicate with the BPM system to identify a satisfaction of the KPI threshold value; and a calendar action processor configured to send a calendar action message to the electronic calendar software application in response to the satisfaction of the KPI threshold value, wherein the calendar action message contains at least one command executable by the electronic calendar software application, wherein, upon receipt of the calendar action message by the electronic calendar software application, the electronic calendar software application being configured to execute the at least one command, wherein the calendar data associated with the user-specified calendar event is modified for each user on the applicable attendee list.

3. The system of claim 1, wherein at least one of the dynamic calendar event definitions cause scheduled meeting attendees for a periodic meeting to automatically receive a meeting cancelation message and to no longer be scheduled to attend a meeting when their work performance exceeds a desired threshold, which is a threshold calculated from the KPI maintained in the business process monitoring system.

4. The system of claim 1, wherein the dynamic calendar event manager further comprises:

a dynamic calendar management interface configured to facilitate user-creation and user-modification of the dynamic calendar event definition, wherein the dynamic calendar event definition defines two or more different KPIs and two or more different thresholds, one per KPI, joined by a logical operator, where the conditional logic is evaluated by the dynamic calendar event manager to determine if a modification of the calendar data is to occur.

5. The system of claim 4, wherein the dynamic calendar management interface is a plug-in component for a user interface of the electronic calendar software application, wherein the dynamic calendar management interface is configured to present values for the plurality of KPIs from the BPM system for the plurality of users within the user interface of the electronic calendar software application.

6. The system of claim 1, wherein a data store of the business process monitoring system associates the KPI thresholds with specific calendar actions and indicates whether the calendar actions affect all meeting attendees or a defined subset of attendees.

7. The system of claim 1, wherein the calendar actions comprise a create event action, a cancel event action, and a modify event action.

8. The system of claim 1, wherein a user interface of the electronic calendar application displays values of KPIs obtained from the BPM system.

9. A method for dynamically managing electronic calendar events based upon key performance indicators (KPI's) of a business process monitoring (BPM) system comprising:

creating a dynamic calendar event definition in an electronic calendar software application for a user-specified calendar event using a user interface of the electronic calendar application, wherein the dynamic calendar event definition defines at least one condition for modifying calendar data of a user-specified calendar event, wherein the dynamic calendar event definition comprises at least a KPI threshold value, an associated calendar action, and an applicable attendee list, wherein the applicable attendee list is dynamically modified based on performance data of included attendees, as maintained by the business process monitoring system;

monitoring key performance indicator (KPI) data collected by the business process monitoring (BPM) system;

dynamically determining a satisfaction of the KPI threshold value with the KPI data of the BPM system in real-time; and responsive to said determining, automatically modifying, by the electronic calendar application, the calendar data and the applicable attendee list for the user-specified calendar event.

10. The method of claim 9, wherein the creating step utilizes a dynamic calendar management interface, wherein said interface is a plug-in component of the electronic calendar software application, wherein a data store where the KPI threshold values are stored is a data store of the business process monitoring system, wherein the business process monitoring system comprises a software system independent of the electronic calendar application.

11. The method of claim 9, wherein the determining step further comprises:

comparing a data value of the KPI data against the KPI threshold value, wherein said KPI threshold value is an expression defining a limit of the data value.

12. The method of claim 9, wherein the modifying step further comprises:

generating a calendar action message containing the calendar action and the applicable attendee list associated with the satisfied KPI threshold value, wherein said calendar action is represented by at least one command executable by the electronic calendar software application; and conveying the calendar action message to the electronic calendar software application.

13. The method of claim 12, wherein upon receipt of the calendar action message by the electronic calendar software application, further comprising:

altering the calendar data associated with the user-specified calendar event for each user contained in the applicable attendee list by the electronic calendar software application in accordance with the calendar action.

14. The method of claim 13, wherein said alteration of the calendar data generates at least one of an event invitation message, an event cancellation message, and an event update message, wherein said generated message is sent to each user on the applicable attendee list.

15. The method of claim 9, wherein the dynamic calendar event definition contains a plurality of KPI threshold values, calendar actions, and applicable attendee lists for the user-specified calendar event.

16. The method of claim 9, wherein the KPI threshold value comprises a plurality of KPI threshold values associated by logical operators.

17. The method of claim 9, wherein said steps of claim 9 are performed by at least one machine in accordance with at least one computer program stored in a computer readable media, said computer programming having a plurality of code sections that are executable by the at least one machine.

18. A dynamic calendar event manager for dynamically managing electronic calendar events based upon key performance indicators (KPI's) of a business process monitoring (BPM) system comprising:
- a plurality of dynamic calendar event definitions, stored in a non-transitory storage medium, defining conditions for modifying calendar data of an electronic calendar software application associated with a user-specified calendar event, wherein each dynamic calendar event definition comprises at least one KPI threshold value, a calendar action, and an associated applicable attendee list;
- a calendar event monitor, comprising program instructions that are stored in a non-transitory storage medium, at least one processor executing the program instructions to communicate with the business process monitoring (BPM) system to determine a satisfaction of at least one KPI threshold value of a dynamic calendar event definition; and
- a calendar action processor, comprising program instructions that are stored in a non-transitory storage medium, at least one processor executing the program instructions to send a calendar action message to the electronic calendar software application in response to the satisfaction of the at least one KPI threshold value, wherein the calendar action message contains at least one command executed by the electronic calendar application to automatically modify the applicable attendee associated with the satisfaction of the at least one KPI threshold value.

19. The dynamic calendar event manager of claim 18, further comprising:
- a dynamic calendar management interface configured to facilitate user-creation and user-modification of the plurality of dynamic calendar event definitions, wherein the dynamic calendar management interface is a plug-in component of a user interface of the electronic calendar software application.

20. The dynamic calendar event manager of claim 18, wherein the KPI threshold value comprises a plurality of KPI threshold values associated by at least one logical operator.

* * * * *